US012607810B2

(12) United States Patent
Katou et al.

(10) Patent No.: US 12,607,810 B2
(45) Date of Patent: Apr. 21, 2026

(54) LENS UNIT, OPTICAL WAVEGUIDE DEVICE, AND OPTICAL TRANSMISSION DEVICE

(71) Applicant: SUMITOMO OSAKA CEMENT CO., LTD., Tokyo (JP)

(72) Inventors: Kei Katou, Tokyo (JP); Hideki Ichimei, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 279 days.

(21) Appl. No.: 18/555,920

(22) PCT Filed: Sep. 30, 2021

(86) PCT No.: PCT/JP2021/036194
§ 371 (c)(1),
(2) Date: Oct. 18, 2023

(87) PCT Pub. No.: WO2023/053363
PCT Pub. Date: Apr. 6, 2023

(65) Prior Publication Data
US 2024/0201455 A1 Jun. 20, 2024

(51) Int. Cl.
*G02B 6/42* (2006.01)
*G02B 6/32* (2006.01)

(52) U.S. Cl.
CPC ............ *G02B 6/4204* (2013.01); *G02B 6/32* (2013.01); *G02B 6/4244* (2013.01); *G02B 6/4206* (2013.01)

(58) Field of Classification Search
None
See application file for complete search history.

(56) References Cited

U.S. PATENT DOCUMENTS

| | | | | |
|---|---|---|---|---|
| 5,420,722 A | * | 5/1995 | Bielak | G02B 6/4204 |
| | | | | 359/708 |
| 5,793,792 A | * | 8/1998 | Baxter | H01S 5/02326 |
| | | | | 372/101 |
| 6,985,506 B2 | * | 1/2006 | Lissotschenko | H01S 5/02326 |
| | | | | 372/101 |
| 9,229,169 B2 | * | 1/2016 | Doany | H01L 21/302 |

(Continued)

FOREIGN PATENT DOCUMENTS

| | | |
|---|---|---|
| JP | 2007-264548 A | 10/2007 |
| JP | 2018-036637 A | 3/2018 |

(Continued)

OTHER PUBLICATIONS

International Search Report corresponding to International Application No. PCT/JP2021/036194 dated Dec. 21, 2021, 3 pages.

*Primary Examiner* — Jerry Rahll
(74) *Attorney, Agent, or Firm* — Rankin, Hill & Clark LLP

(57) ABSTRACT

Mechanical strength of a lens that optically couples an optical waveguide and an optical fiber provided on a substrate is improved. A lens unit that optically couples an optical waveguide provided on a substrate and an optical fiber has a lens portion and a holding portion that holds the lens portion, and the holding portion has a thick portion, along one side surface that is not a surface through which an optical axis passes, in which a thickness measured in a direction of the optical axis is larger than a thickness of an other portion of the holding portion.

10 Claims, 10 Drawing Sheets

(56)　　　　　　References Cited

U.S. PATENT DOCUMENTS

| | | | | |
|---|---|---|---|---|
| 11,333,832 | B2 * | 5/2022 | Sakai | G02B 6/4246 |
| 11,960,128 | B2 * | 4/2024 | Goldis | G02B 6/4219 |
| 12,271,042 | B2 * | 4/2025 | Goldis | G02B 6/4296 |
| 2006/0164738 | A1 * | 7/2006 | Yamamoto | G02B 6/3829 |
| | | | | 359/871 |
| 2012/0057828 | A1 * | 3/2012 | Mitamura | G02B 6/4292 |
| | | | | 156/60 |
| 2013/0084039 | A1 * | 4/2013 | Doany | H01L 21/302 |
| | | | | 438/31 |
| 2014/0199019 | A1 * | 7/2014 | Yabre | G02B 6/4243 |
| | | | | 385/14 |
| 2015/0253521 | A1 * | 9/2015 | Maruyama | G02B 6/4244 |
| | | | | 385/11 |
| 2015/0261017 | A1 * | 9/2015 | Doi | H04B 10/501 |
| | | | | 398/201 |
| 2017/0052333 | A1 * | 2/2017 | Morioka | G02B 6/4292 |
| 2017/0059781 | A1 * | 3/2017 | Fortusini | G02B 6/322 |
| 2018/0284352 | A1 * | 10/2018 | Miyazaki | G02B 6/2773 |
| 2019/0302370 | A1 * | 10/2019 | Sugata | G02B 6/4214 |
| 2020/0363594 | A1 * | 11/2020 | Lu | G02B 6/30 |
| 2021/0294040 | A1 * | 9/2021 | Sakai | G02B 6/4246 |
| 2024/0201455 | A1 * | 6/2024 | Katou | G02B 6/4214 |

FOREIGN PATENT DOCUMENTS

| | | | |
|---|---|---|---|
| JP | 2018-173594 | A | 11/2018 |
| JP | 2019-152732 | A | 9/2019 |
| JP | 2021-148952 | A | 9/2021 |
| WO | 2018/031916 | A1 | 2/2018 |

* cited by examiner

CROSS-SECTIONAL VIEW TAKEN ALONG LINE XI-XI

RELATED ART

LENS UNIT, OPTICAL WAVEGUIDE DEVICE, AND OPTICAL TRANSMISSION DEVICE

TECHNICAL FIELD

The present invention relates to a lens unit that optically couples an optical waveguide and an optical fiber, an optical waveguide device using the lens unit, and an optical transmission device using the optical waveguide device.

BACKGROUND ART

In high-frequency/large-capacity optical fiber communication systems, optical transmission devices, into which waveguide type optical elements (hereinafter, referred to as optical modulation elements) performing optical modulation are incorporated, are generally used. Among them, an optical modulation element whose substrate is made of LiNbO₃ (hereinafter, also referred to as LN) having an electro-optic effect is widely used in the high-frequency/large-capacity optical fiber communication system since the optical modulation element has a smaller optical loss and can achieve more broadband optical modulation characteristics than a modulation element using a semiconductor-based material, such as indium phosphide (InP), silicon (Si), or gallium arsenide (GaAs).

Patent Literature No. 1 discloses an optical element module in which an optical waveguide formed on a substrate is optically coupled to an optical fiber by using a lens unit in which an other surface facing one surface provided with a protruding curved surface is processed to be flat.

In recent years, for further low-voltage driving and high-frequency modulation of an optical modulator while miniaturizing the optical modulator itself, an optical modulator using a rib-type optical waveguide or ridge optical waveguide (hereinafter, collectively referred to as protruding optical waveguide) provided by forming a strip-shaped protruding portion on a surface of a thinned (thin-plated) LN substrate (for example, thickness of 20 μm or lower) is being put to practical use to further strengthen the interaction between a signal electric field and guided light in the substrate (for example, Patent Literature No. 2 and No. 3).

Further, efforts such as accommodating an electronic circuit and an optical modulation element in one chassis to integrate the electronic circuit and the optical modulation element as an optical modulation module, in addition to miniaturization of the optical modulation element itself, are also underway. For example, an optical modulation module has been proposed in which an optical modulation element and a high-frequency driver amplifier that drives the optical modulation element are integrated and accommodated in one chassis and light input and output ports are disposed in parallel on one surface of the chassis. With this configuration, the optical modulation module has a small size and a high degree of integration. In the optical modulation element used in such an optical modulation module, an optical waveguide whose light propagation direction is folded back on a substrate comprising the optical modulation element is formed such that a light input end and a light output end of the optical waveguide are disposed on one side of the substrate (for example, Patent Literature No. 4). Hereinafter, the optical modulation element comprising the optical waveguide including such a folded-back portion in the light propagation direction will be referred to as a folded-back optical modulation element.

CITATION LIST

Patent Literature

[Patent Literature No. 1] Japanese Laid-open Patent Application No. 2018-173594
[Patent Literature No. 2] Japanese Laid-open Patent Publication No. 2007-264548
[Patent Literature No. 3] Pamphlet of International Publication No. WO2018/031916
[Patent Literature No. 4] Japanese Laid-open Patent Publication No. 2019-152732

SUMMARY OF INVENTION

Technical Problem

FIG. 9 is a three-plan view of an example of a configuration of a lens unit similar to the lens unit in the related art, which is described in Patent Literature No. 1. FIG. 10 is a view of a disposition example in a case where the optical waveguide is optically coupled to the optical fiber using the lens unit shown in FIG. 9.

In FIG. 9, a lower right view is a front view of a lens unit 90, a left view is a side view of the lens unit 90 viewed from a left side of the front view, and an upper view is a side view of the lens unit 90 viewed from an upper side of the front view.

The lens unit 90 includes a lens portion 91 and a holding portion 92 that holds the lens portion 91. The lens portion 91 is a curved protruding portion formed on a lens surface 921, which is one surface of the holding portion 92. As shown in FIG. 10, a support surface 922, which is a surface of the holding portion 92 facing the lens surface 921, is supported in an adhesively fixed manner to an end surface of a substrate 94 on which an optical waveguide 93 is formed. Both the lens surface 921 and the support surface 922 may be a light input surface or a light output surface of the lens unit 90, depending on how the lens unit 90 is used.

As shown in FIG. 10, in a case where the optical waveguide 93 is optically coupled to an optical fiber 95 using the lens unit 90, for example, the substrate 94 on which the optical waveguide 93 is formed is fixed inside a chassis (not shown). Then, both ends of the lens unit 90 (for example, left and right hatched portions in the front view shown in FIG. 9) are respectively gripped by clamping jigs 97a, 97b and 97c, 97d (hereinafter, collectively referred to as clamping jig 97) in a thickness direction of the lens unit 90, and a position of the lens unit 90 is aligned to an appropriate position such that power of light input from the optical waveguide 93 and output from the optical fiber 95 is maximized.

After the alignment, the support surface 922 of the lens unit 90 is fixed to the end surface of the substrate 94 with an optical adhesive or the like. Here, in a terminal portion 951 of the optical fiber 95, a lens 952 that condenses the output light from the lens unit 90 is fixed, for example, at a position adjusted in advance with respect to the optical fiber 95 according to the related art. The lens unit 90 may be gripped in a direction orthogonal to an optical axis direction of the lens unit 90 from side surfaces 925 and 924 of the lens unit 90 like clamping jigs 98a and 98b (hereinafter, referred to as the clamping jig 98) shown by dotted lines in the drawing, in addition to the thickness direction of the lens unit 90 like the clamping jig 97.

Further, as another method of holding the lens unit 90 during the alignment work, a method of sucking and holding one side surface 923 of the lens unit 90 using a suction jig, in addition to the clamping jig as described above, or the like may be considered.

A thickness L90 of the holding portion 92 depends on the numerical aparture (NA) of the optical waveguide 93 and needs to be smaller as the larger the NA is larger, that is, a divergence angle φ of a beam output from the optical waveguide 93 is larger. Further, the NA of the optical waveguide 93 is larger as a mode field diameter of the optical waveguide 93 is smaller.

For example, in the folded-back optical modulation element described above, in order to reduce an optical radiation loss of the optical waveguide in the folded-back portion in the light propagation direction, a protruding waveguide having a small mode field diameter and strong optical confinement characteristics is used as the optical waveguide. As an example, in an optical modulator using the LN substrate, the mode field diameter of such a protruding waveguide is as small as about 3 to 5 μm while a mode field diameter of a diffusion type waveguide formed by diffusing titanium metal on the LN substrate is 6 to 10 μm. Therefore, the NA of the protruding waveguide is about twice as large as the NA of the diffusion type waveguide, and thus the thickness L90 of the holding portion 92 of the lens unit 90, which is used for coupling the protruding waveguide and the optical fiber, may be as thin as half that of the diffusion type waveguide, for example, about 0.5 μm.

In a case where such a thin holding portion 92 is gripped by the clamping jig 97 or the clamping jig 98, stress is applied to the lens unit 90 due to the gripping force, which may cause the holding portion 92 to be deformed or damaged. Further, in a case where the side surface 923 of the holding portion 92 of the lens unit 90 is sucked and held by the suction jig, a diameter of a suction hole of the suction jig needs to be reduced according to the thickness of the side surface 923, and thus suction force in sucking the lens unit 90 is weakened. As a result, the lens unit 90 may fall off from the suction jig during the alignment, or highly accurate adjustment may be difficult due to a slip of a suction position on the side surface 923.

From the above background, an object of the present invention is to improve mechanical strength of a lens that optically couples an optical waveguide provided on a substrate and an optical fiber.

Solution to Problem

One aspect of the present invention is a lens unit that optically couples an optical waveguide provided on a substrate and an optical fiber including a lens portion, and a holding portion that holds the lens portion, in which the holding portion has a thick portion, along one side surface that is not a surface through which an optical axis of the lens portion passes, in which a thickness of the holding portion measured in a direction of the optical axis is larger than a thickness of an other portion of the holding portion.

According to another aspect of the present invention, a plurality of the lens portions disposed along one direction are provided, and the thick portion of the holding portion extends along a disposition direction of the lens portion.

According to another aspect of the present invention, the holding portion further has a thick portion, on an other side surface facing the one side surface with the lens portion interposed therebetween, in which a thickness measured in the direction of the optical axis is larger than a thickness of an other portion of the holding portion.

According to another aspect of the present invention, the thickness of the thick portion on the other side surface in the holding portion is thinner than the thickness of the thick portion on the one side surface.

According to another aspect of the present invention, the thick portion has an inclined portion whose thickness continuously decreases toward the lens portion.

Another aspect of the present invention is an optical waveguide device including an optical waveguide element that has an optical waveguide provided on a substrate, a chassis that accommodates the optical waveguide element, an input optical fiber and an output optical fiber that propagate input light and output light of the optical waveguide element, and any one of the above lens units that is disposed between the optical waveguide element and the input optical fiber and the output optical fiber.

According to another aspect of the present invention, the chassis includes a case, which is a hexahedron, whose one surface is open, and a cover that covers the open one surface of the case, and the lens unit is disposed such that the one side surface provided with the thick portion faces the open one surface of the case.

According to another aspect of the present invention, the optical waveguide element has, on one end surface of the substrate, a light input end of the optical waveguide that receives the input light and a light output end of the optical waveguide that outputs the output light, both the input optical fiber and the output optical fiber are fixed to one surface of the chassis, and the lens unit disposed between the optical waveguide element and the input optical fiber and the output optical fiber includes the number of the lens portions equal to a sum of the number of input light beams input to the optical waveguide element and the number of output light beams output from the optical waveguide element.

According to another aspect of the present invention, an optical assembly disposed between the optical waveguide element and the input optical fiber and/or the output optical fiber is provided, and the optical assembly and the thick portion on the one side surface of the lens unit have portions that overlap each other in a plan view of the case as viewed from the opening.

According to another aspect of the present invention, the optical waveguide element is an optical modulation element that modulates and outputs the input light from the input optical fiber, and an electronic circuit that drives the optical waveguide element is provided inside the chassis.

According to still another aspect of the present invention, there is an optical transmission device including any one of the above optical waveguide devices, and an electronic circuit that generates an electrical signal for causing the optical waveguide element to perform a modulation operation.

Advantageous Effects of Invention

According to the present invention, it is possible to improve the mechanical strength of the lens disposed between the optical waveguide and the optical fiber.

DESCRIPTION OF EMBODIMENTS

Hereinafter, embodiments of the present invention will be described with reference to drawings.

1. First Embodiment

Figure 1:
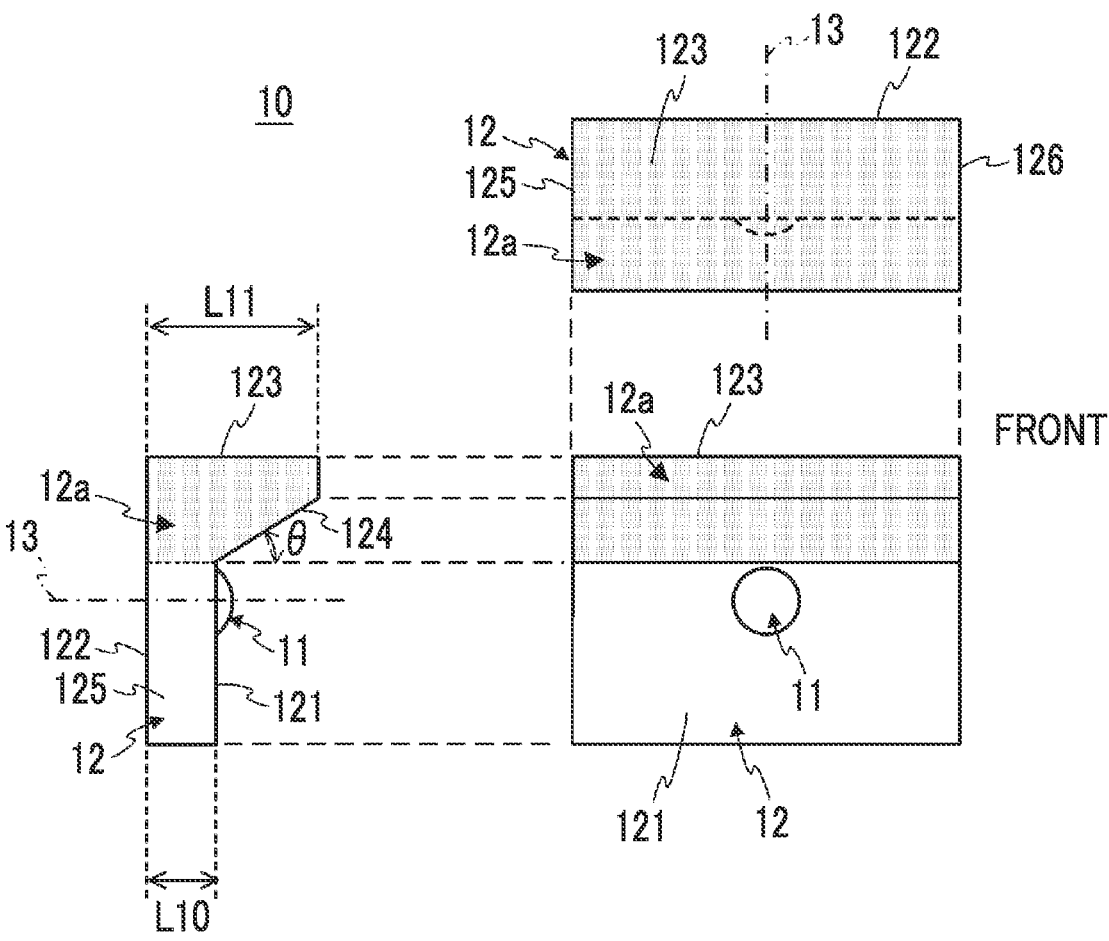
FIG. 1 is a view of a configuration of a lens unit according to a first embodiment of the present invention.

First, a first embodiment of the present invention will be described. FIG. 1 is a three-plan view of a configuration of a lens unit 10 according to the first embodiment of the present invention. In FIG. 1, a lower right view of the drawing is a front view of the lens unit 10; a left view is a side view of the lens unit 10 viewed from a left side of the front view, and an upper view is a side view of the lens unit 10 viewed from an upper side of the front view.

The lens unit 10 is, for example, disposed between an optical fiber and an optical waveguide element having an optical waveguide provided on a substrate and condenses or collimates input light or output light of the optical waveguide to optically couple the optical waveguide to the optical fiber.

The lens unit 10 has a lens portion 11 and a holding portion 12 that holds the lens portion 11 in the same manner as the lens unit 90 in the related art described above. In the lens unit 10, for example, the lens portion 11 and the holding portion 12 may be integrally made of the same material by applying press work to a glass heated to a softening point or higher.

The lens portion 11 is a curved protruding portion formed on a lens surface 121, which is one surface of the holding portion 12. A support surface 122 of the holding portion 12 facing the lens surface 121 on which the lens portion 11 is formed is supported in an adhesively fixed manner to an end surface of the substrate on which the optical waveguide is formed. Both the lens surface 121 and the support surface 122 may be a light input surface or a light output surface of the lens unit 10 depending on how the lens unit 10 is used.

In the lens unit 10 according to the present embodiment, in particular, the holding portion 12 has a thick portion 12a (hatched portion in the drawing) in which a thickness L11 measured in a direction of an optical axis 13 is larger than a thickness L10 of an other portion of the holding portion 12, along one side surface 123 (that is, not the lens surface 121 and the support surface 122) that is not a surface through which the optical axis 13 of the lens portion 11 passes, in a range not including the lens portion 11. The thick portion 12a comprises, for example, the entire side surface 123.

Accordingly, in the lens unit 10, with the thick portion 12a having the thickness L11 larger than the thickness L10 while securing the thickness L10 of the holding portion 12, which is a distance from the support surface 122 to the lens portion 11, at a constant value, it is possible to improve mechanical strength of the lens unit 10 as a whole. Therefore, in the lens unit 10, for example, in alignment work in optically coupling the optical waveguide to the optical fiber using the lens unit 10, it is possible to prevent breakage such as deformation or damage from occurring with a clamping jig gripping the thick portion 12a.

Further, a size of the side surface 123 is increased due to the presence of the thick portion 12a. Therefore, in a case where a suction jig is used in the alignment work, it is possible to secure sufficient suction force with the suction jig sucking the side surface 123 along the thick portion 12a. Accordingly, the lens unit 10 is prevented from falling off or slipping from the suction jig, and highly accurate position adjustment is possible.

Figure 2:
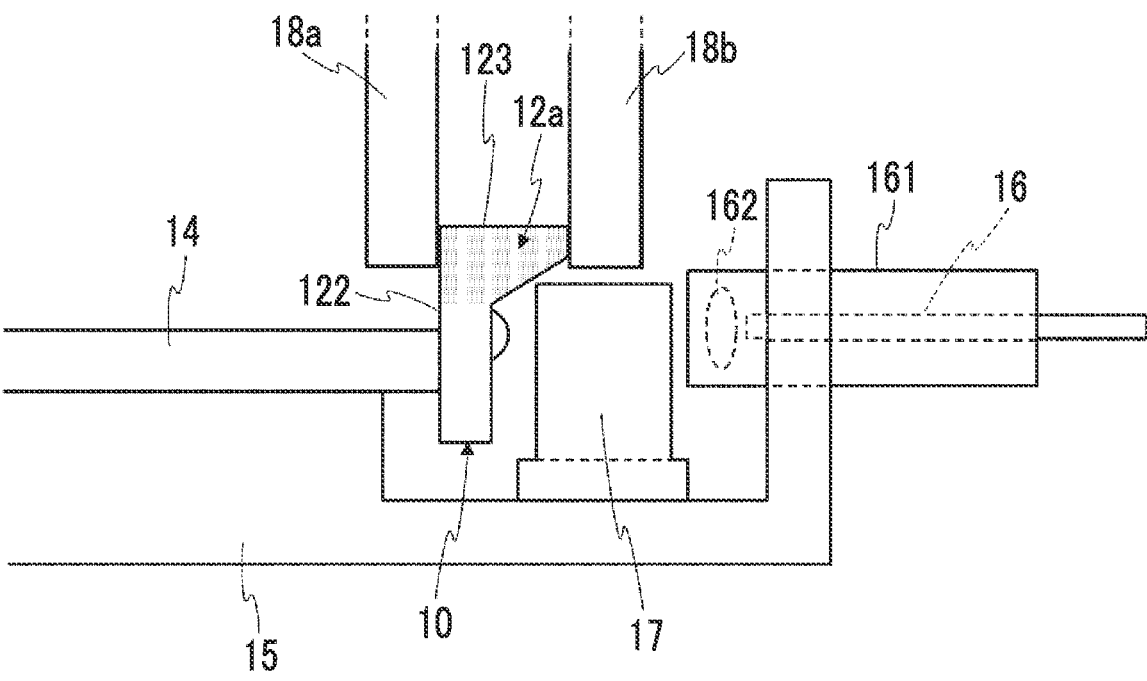
FIG. 2 is a view of a disposition example in a case where an optical waveguide is optically coupled to an optical fiber using the lens unit shown in FIG. 1.

FIG. 2 is a view of a disposition example in a case where the optical waveguide is optically coupled to the optical fiber using the lens unit 10 shown in FIG. 1. In FIG. 2, an optical waveguide element 14 in which the optical waveguide is formed on the substrate is fixed to a case 15. Further, a terminal portion 161 of an optical fiber 16 is fixed to the position of the case 15 facing an end section of the optical waveguide element 14. The terminal portion 161 is provided with a lens 162 whose position has been adjusted in advance with respect to the optical fiber 16. Further, an optical assembly 17 including, for example, an optical filter or the like is disposed between the end section of the optical waveguide element 14 and the optical fiber 16.

Figure 10:
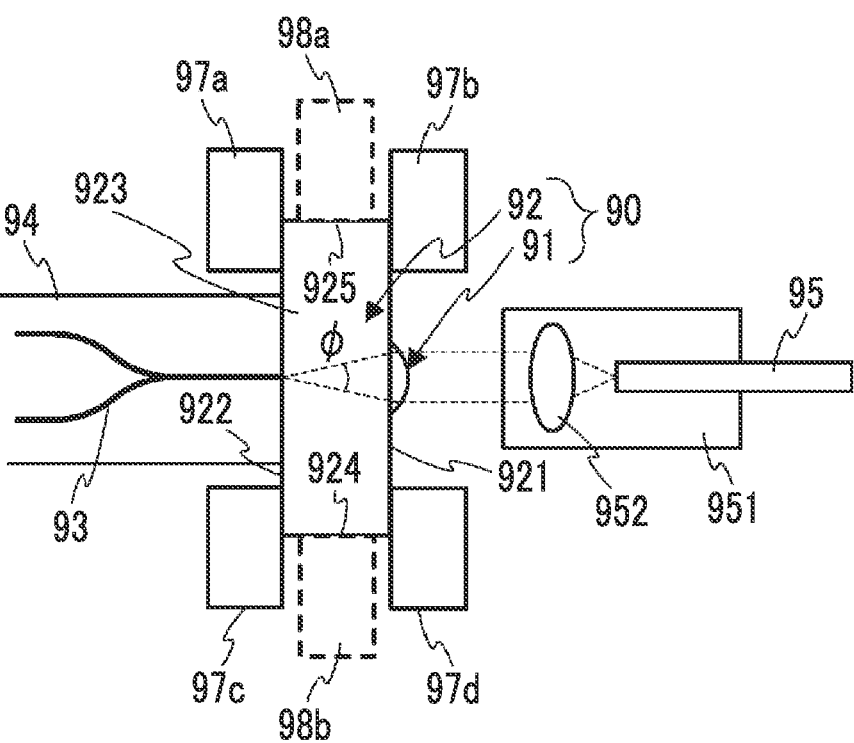
FIG. 10 is a view of a disposition example in a case where an optical waveguide is optically coupled to an optical fiber using the lens unit in the related art shown in FIG. 9.

The lens unit 10 is mounted, for example, in a state where the side surface 123 along the thick portion 12a faces an opening direction (upward direction in the drawing) of the case 15. For example, the thick portion 12a of the lens unit 10 is gripped by clamping jigs 18a and 18b, and the lens unit 10 is inserted into the case 15 from the upper side in the drawing. Instead of the above, the lens unit 10 may be gripped from side surfaces 125 and 126 of the lens unit 10 in a direction orthogonal to the direction of the optical axis 13 of the lens unit 10 in the same manner as the clamping jigs 98a and 98b shown in FIG. 10.

In the alignment work, a position of the lens unit 10 is adjusted by the clamping jigs 18a and 18b, and the support surface 122 is adhesively fixed to the end section of the optical waveguide element 14 after the adjustment. In particular, in the lens unit 10, the thickness of the portion other than the thick portion 12a is formed thinner than the thickness of the thick portion 12a. Thus, the optical assembly 17 can be inserted under the thick portion 12a, as shown in FIG. 2. Accordingly, it is possible to prevent a size of the case 15 from being increased due to the presence of the thick portion 12a.

From the viewpoint of the mechanical strength of the lens unit 10, it is desirable that the thick portion 12a comprises the entire side surface 123 as shown in FIG. 1. Further, in the present embodiment, the thick portion 12a is formed such that a level difference is not generated on the support surface 122 as shown in FIG. 1. However, the thick portion 12a may be provided such that a level difference is formed on the support surface 122 as long as there is no problem in fixing the support surface 122 to the optical waveguide.

Further, it is preferable that the thick portion 12a is configured to have an inclined portion 124 whose thickness continuously decreases toward the lens portion 11 as shown in FIG. 1 such that the light input into or output from the lens portion 11 is not blocked by the thick portion 12*a*. From the viewpoint of sufficiently preventing the light input into or output from the lens portion 11 from being blocked, it is desirable that an inclination angle θ of the inclined portion 124 with respect to the optical axis 13 of the lens portion 11 is 20 degrees or higher and 45 degrees or lower.

In a case where the thick portion 12*a* is formed sufficiently apart from the lens portion 11, the holding portion 12 may be configured such that the thicknesses of the thick portion 12*a* and the portion other than the thick portion 12*a* are changed stepwise (that is, inclination angle θ=90 degrees) without providing the inclined portion 124.

Next, a modification example of the lens unit 10 will be described.

1.1 First Modification Example

Figure 3:
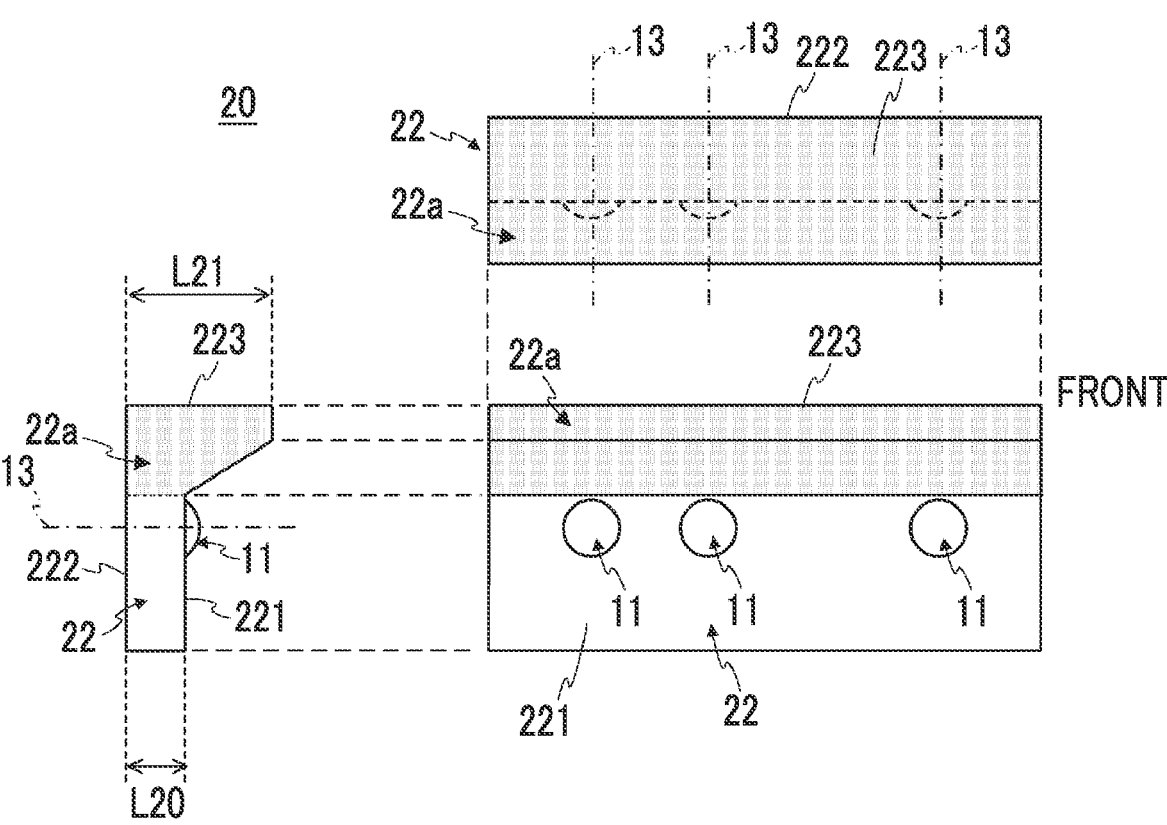
FIG. 3 is a view of a configuration of a lens unit according to a first modification example.

FIG. 3 is a diagram showing a configuration of a lens unit 20 according to a first modification example. In FIG. 3, a lower right view of the drawing is a front view of the lens unit 20; a left view is a side view of the lens unit 20 viewed from a left side of the front view, and an upper view is a side view of the lens unit 20 viewed from an upper side of the front view. In FIG. 3, the same reference numerals as those in FIG. 1 are used to denote the same configuration components as those of the lens unit 10 shown in FIG. 1, and the description for FIG. 1 described above is used.

The lens unit 20 has the same configuration as the lens unit 10 shown in FIG. 1. However, a plurality of lens portions 11 are disposed in one direction (left-right direction in the front view of the drawing), and a thick portion 22*a* of a holding portion 22 extends along a disposition direction of the lens portions 11.

As in the lens unit 10, the lens portion 11 and the holding portion 22 of the lens unit 20 are integrally made of, for example, the same material, and the lens portion 11 is formed on a lens surface 221 which is one surface of the holding portion 22. A support surface 222 of the holding portion 22 facing the lens surface 221 is supported in an adhesively fixed manner to, for example, an end surface of a substrate (hereinafter, also referred to as optical waveguide substrate) on which an optical waveguide is formed. Further, a thickness L21 measured in a direction of an optical axis 13 of the thick portion 22*a* is formed to be larger than a thickness L20 of an other portion of the holding portion 22, along one side surface 223 (that is, not the lens surface 221 and the support surface 222) that is not a surface through which the optical axis 13 of the lens portion 11 passes, and the thick portion 22*a* is provided on a portion not including the lens portion 11.

In the lens unit 20, as in the lens unit 10 shown in FIG. 1, with the thick portion 22*a* having the thickness L21 larger than the thickness L20 while securing the thickness L20 of the holding portion 22, which is a distance from the support surface 222 to the lens portion 11, at a constant value, it is possible to improve mechanical strength of the lens unit 20 as a whole. In particular, in the lens unit 20, since the thick portion 22*a* is formed to extend in the disposition direction of the lens portions 11, bending strength along the disposition direction is improved. Therefore, in the lens unit 20, for example, it is possible to prevent the support surface 222 from being curved due to stress from the clamping jig during the alignment, which lowers the adhesion to the optical waveguide substrate.

The number of the lens portions 11 to be disposed is three in the example of FIG. 2, but the number is not limited thereto and can be any number of two or higher.

1.2 Second Modification Example

Figure 4:
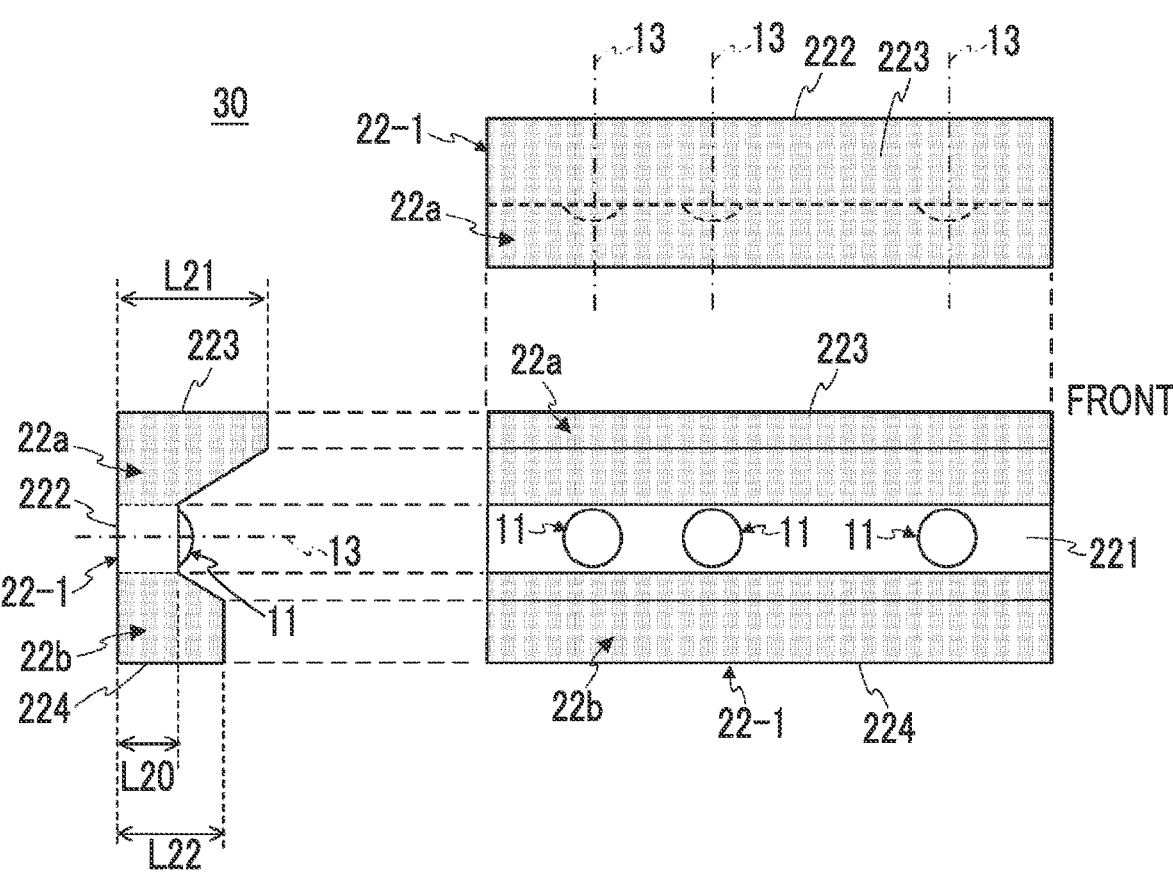
FIG. 4 is a view of a configuration of a lens unit according to a second modification example.

FIG. 4 is a diagram showing a configuration of a lens unit 30 according to a second modification example. In FIG. 4, a lower right view of the drawing is a front view of the lens unit 30; a left view is a side view of the lens unit 30 viewed from a left side of the front view, and an upper view is a side view of the lens unit 30 viewed from an upper side of the front view. In FIG. 4, the same reference numerals as those in FIGS. 1 and 3 are used to denote the same configuration components as the configuration components shown in FIGS. 1 and 3, and the descriptions for FIGS. 1 and 3 described above are used.

The lens unit 30 has the same configuration as the lens unit 20 shown in FIG. 3, except that a holding portion 22-1 is provided instead of the holding portion 22. The holding portion 22-1 has the same configuration as the holding portion 22. However, a thick portion 22*b* is provided along an other side surface 224 facing the side surface 223 with the lens portion 11 interposed therebetween, in addition to the thick portion 22*a* provided along the side surface 223. In the example shown in FIG. 4, a thickness L22 of the thick portion 22*b* is thinner than, for example, the thickness L21 of the thick portion 22*a* (L22<L21).

In the lens unit 30 having the above configuration, as in the lens unit 10 shown in FIG. 1, with the thick portions 22*a* and 22*b* while securing the thickness L20 at a constant value, it is possible to improve mechanical strength of the lens unit 30 as a whole.

Further, in the lens unit 30, the thickness L22 of the thick portion 22*b* is formed to be thinner than the thickness L21 of the thick portion 22*a*. Therefore, for example, in a case where the optical assembly 17 as shown in FIG. 2 needs to be disposed between the lens unit 30 and the optical fiber, it is possible to secure a place for disposing such an optical assembly 17 on a side of the thick portion 22*b* in the same manner as the configuration shown in FIG. 2.

In a case where an optical component such as the optical assembly 17 is not used between the substrate and the optical fiber, or in a case where a sufficient space for disposing the optical component may be secured between the substrate and the optical fiber, it is possible to form the thick portion 22*a* and the thick portion 22*b* to have the same thickness (L21=L22).

2. Second Embodiment

Next, a second embodiment of the present invention will be described. The second embodiment is an optical waveguide device configured by using the lens unit 20 or 30 according to the modification example of the first embodiment described above.

Figure 5:
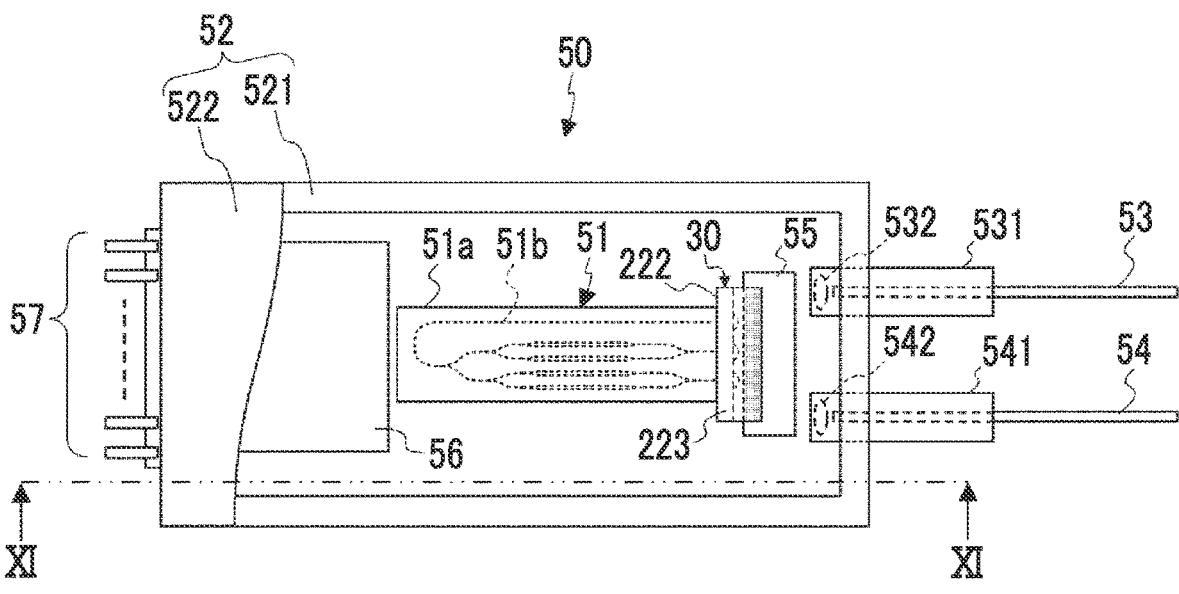
FIG. 5 is a view of a configuration of an optical waveguide device according to a second embodiment of the present invention.
Figure 6:
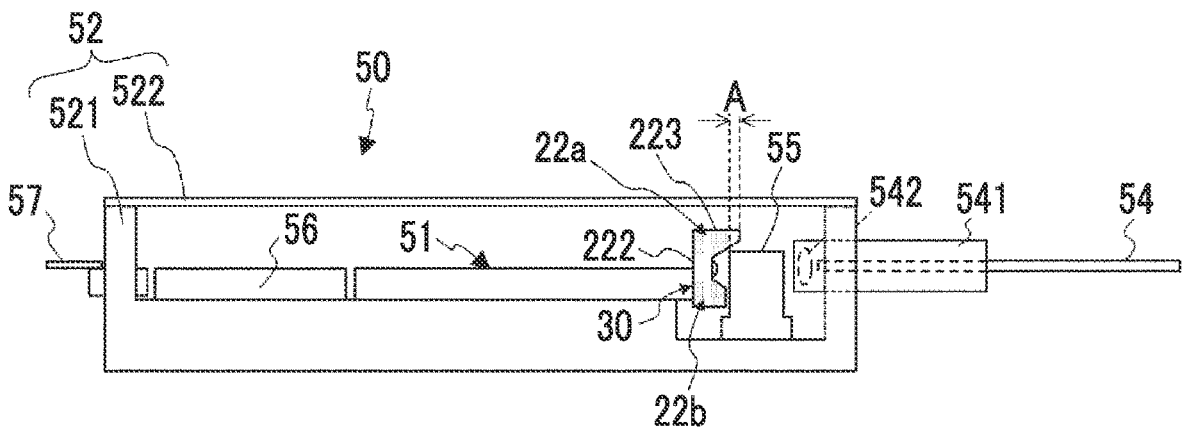
FIG. 6 is a cross-sectional view taken along a line XI-XI of the optical waveguide device shown in FIG. 5.

FIG. 5 is a view of an example of a configuration of an optical waveguide device 50 according to the second embodiment. FIG. 6 is a cross-sectional view taken along a line XI-XI of the optical waveguide device 50 shown in FIG. 5. The optical waveguide device 50 shown in FIG. 5 includes the lens unit 30 shown in FIG. 4 as an example. In FIGS. 5 and 6, the same reference numerals as those shown in FIG. 4 are used to denote the same configuration components as the configuration components shown in FIG. 4, and the description for FIG. 4 described above is used.

The optical waveguide device 50 has an optical wave-guide element 51 having an optical waveguide 51*b* provided on a substrate 51*a*, a chassis 52 that accommodates the optical waveguide element 51, and an input optical fiber 53 and an output optical fiber 54 that propagate input light and output light of the optical waveguide element 51. Further, the lens unit 30 is disposed between the optical waveguide element 51 and the input optical fiber 53 and the output optical fiber 54.

The chassis 52 comprises, for example, a case 521, which is a hexahedron, whose one surface (surface shown in FIG. 5) is open, and a cover 522 that covers the open one surface of the case 521. Although only a part of the cover 522 is drawn in FIG. 5, it should be understood that the cover 522 is configured to cover the entire opening portion of the case 521.

The optical waveguide element 51 is, for example, the folded-back optical modulation element in which the optical waveguide 51*b*, which is a protruding waveguide, is formed on the substrate 51*a* using LN to perform DP-QPSK modu-lation. Such a DP-QPSK modulator may be configured by using a so-called nested Mach-Zehnder optical waveguide. In the optical waveguide element 51, which is an optical modulation element, signal electrodes (not shown) that control a light wave propagating in the optical waveguide 51*b* are formed on the substrate 51*a* according to the related art. These signal electrodes are connected to signal pins 57 provided in the case 521 via a relay substrate 56 disposed in the case 521.

A light propagation direction of the optical waveguide 51*b* of the optical waveguide element 51 is folded back on the substrate 51*a*, and one light input end and two light output ends of the optical waveguide 51*b* are disposed on one end surface of the substrate 51*a*. A sum of the number of input light beams input to the optical waveguide element 51 and the number of output light beams output from the optical waveguide element 51 is three, and the lens unit 30 has the same number of lens portions 11 as the sum.

The input optical fiber 53 and the output optical fiber 54 are both fixed to one surface (surface on right side in the drawing) of the chassis 52 via terminal portions 531 and 541, respectively. Lenses 532 and 542 whose positions are adjusted with respect to the input optical fiber 53 and the output optical fiber 54 are fixed to the terminal portions 531 and 541, respectively.

The light input from the input optical fiber 53 is colli-mated by the lens 532 and then condensed by one lens portion 11 of the lens unit 30 to be coupled to a light input end of the optical waveguide element 51. The two output light beams output from the light output end of the optical waveguide element 51 are two linearly polarized light beams, and the beams are collimated by the other two lens portions 11 of the lens unit 30 and then polarization-combined by the optical assembly 55 to be one light beam.

The optical assembly 55 may include a beam shift prism for moving an optical axis of the input light from the input optical fiber 53 in parallel and a half-wavelength plate and a polarization beam combining prism for polarization-com-bining the two output light from the optical waveguide 51*b*, according to the related art regarding the DP-QPSK modu-lator. The polarization-combined light beam output from the optical assembly 55 is condensed by a lens 542 to be coupled to the output optical fiber 54.

The lens unit 30 is disposed such that the side surface 223 along the thick portion 22*a* faces the opening of the case 521 (that is, upper side in the drawing of FIG. 6). Accordingly, in the manufacturing step of the optical waveguide device

50, the lens unit 30 is held by the clamping jig or the suction jig lowered from the opening of the case 521 during the alignment work, and the position of the lens unit 30 is adjusted. Thereafter, the support surface 222 of the lens unit 30 is fixed to an end surface of the optical waveguide element 51 with an optical adhesive.

The optical assembly 55 is disposed close to the lens portion 11 to a position where the optical assembly 55 is inserted under the thick portion 22*a* of the lens unit 30. That is, the optical assembly 55 and the thick portion 22*a* along the side surface 223 of the lens unit 30 have a portion that overlaps each other (illustrated hatch portion in FIG. 5 and range indicated by reference numeral A in FIG. 6) in a plan view of the case 521 as viewed from the opening of the case 521.

Since the optical waveguide device 50 having the above configuration is configured by using the lens unit 30, it is possible to prevent the lens unit 30 from being deformed or damaged in the alignment work of the optical system during manufacturing and thus improve the manufacturing yield. Further, in the optical waveguide device 50, the optical assembly 55 can be mounted to have the portion that overlaps the thick portion 22*a* of the lens unit 30 in a plan view of the case 521 as viewed from the opening. Therefore, it is possible to prevent the length dimension of the case 521 from being increased even though the thick portion 22*a* is present.

The optical waveguide device 50 may be configured by using the lens unit 20 instead of the lens unit 30. Even in a case where the lens unit 20 is used, it is possible to obtain the same effect as the effect of the optical waveguide device 50 described above.

Third Embodiment

Figure 7:
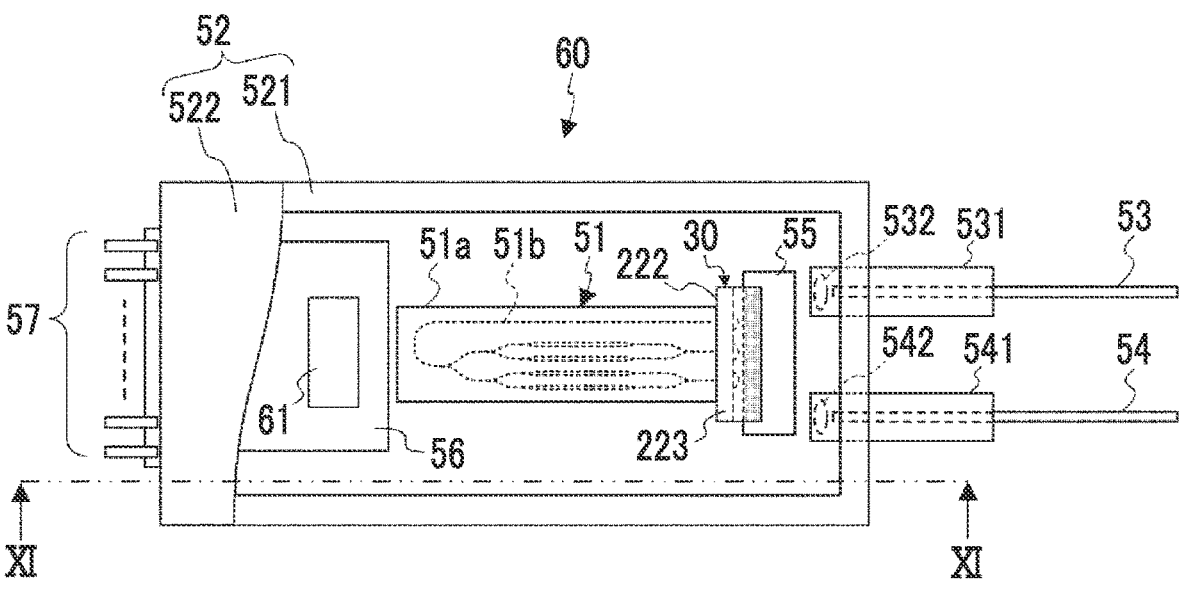
FIG. 7 is a view of a configuration of the optical waveguide device according to a third embodiment of the present invention.

Next, a third embodiment of the present invention will be described. FIG. 7 is a view of a configuration of an optical waveguide device 60 according to the third embodiment of the present invention. In FIG. 7, the same reference numer-als as those in FIGS. 5 and 6 are used to denote the same configuration components as those of the optical waveguide device 50 shown in FIGS. 5 and 6, and the descriptions for FIGS. 5 and 6 described above are used.

The optical waveguide device 60 shown in FIG. 7 has the same configuration as the optical waveguide device 50 shown in FIG. 5, but a drive circuit 61 that drives the optical waveguide element is mounted on the relay substrate 56. As described with reference to FIG. 5, the optical waveguide element 51 is an optical modulation element that modulates and outputs input light from the input optical fiber 53, and is, for example, the DP-QPSK modulator. The drive circuit 61 is mounted, for example, in the form of an integrated circuit (IC).

The drive circuit 61 generates a high-frequency electrical signal for driving the optical waveguide element 51 based on, for example, a modulation signal supplied from the outside via the signal pin 57, and the generated high-frequency electrical signal is output to a signal electrode (not shown) formed on the substrate 51*a* of the optical wave-guide element 51.

Since the optical waveguide device 60 having the above configuration uses the lens unit 30 having the thick portion 22*a* in the same manner as the optical waveguide device 50 according to the second embodiment, it is possible to prevent the lens unit 30 from being deformed or damaged during manufacturing while suppressing the increase in the length dimension of the case 521 and thus improve the manufacturing yield.

The optical waveguide device 60 may also use the lens unit 20 instead of the lens unit 30 in the same manner as the optical waveguide device 50 shown in FIG. 5. Even in a case where the lens unit 20 is used, it is possible to obtain the same effect as the effect described above.

3. Fourth Embodiment

Figure 8:
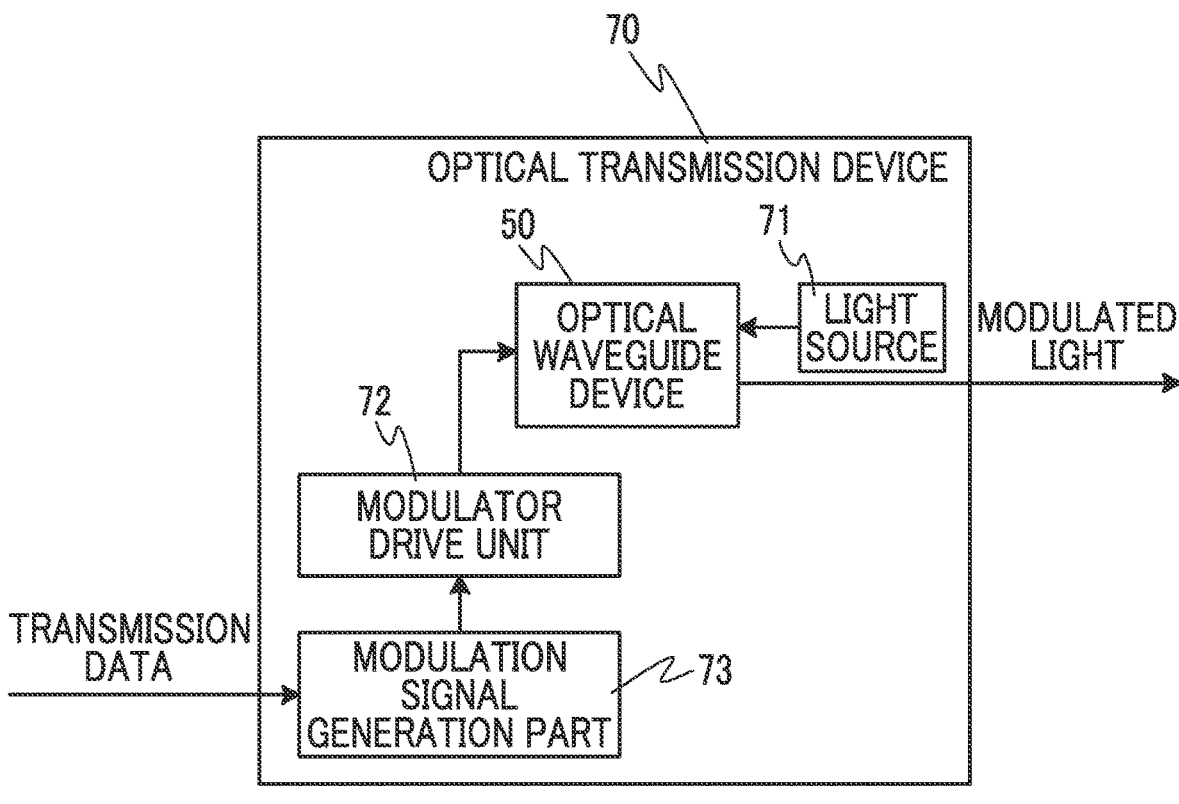
FIG. 8 is a diagram showing a configuration of an optical transmission device according to a fourth embodiment of the present invention.
Figure 9:
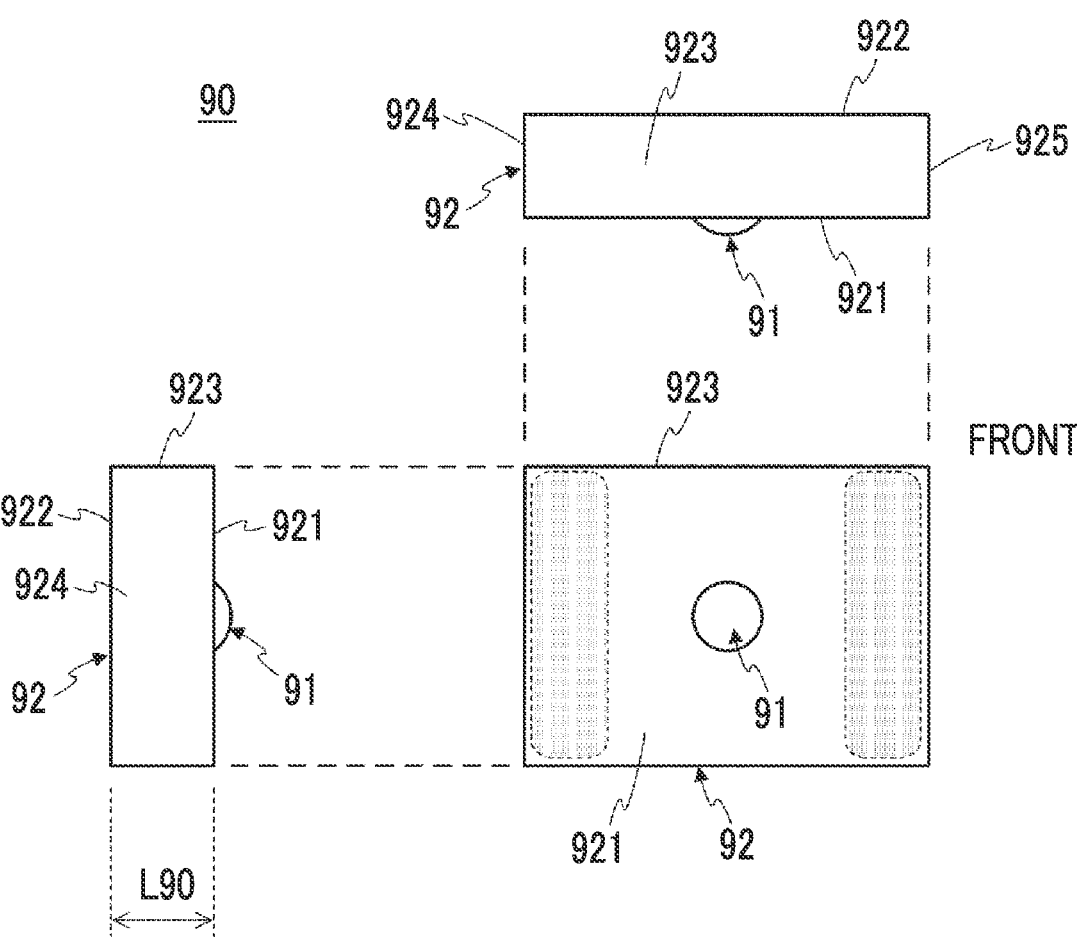
FIG. 9 is a view of an example of a configuration of a lens unit in the related art.

Next, a fourth embodiment of the present invention will be described. The present embodiment is an optical transmission device 70 equipped with the optical waveguide device 50 according to the second embodiment. FIG. 8 is a diagram showing a configuration of the optical transmission device 70 according to the present embodiment. The optical transmission device 70 has the optical waveguide device 50, a light source 71 that inputs light to the optical waveguide device 50, a modulator drive unit 72, and a modulation signal generation part 73.

The modulation signal generation part 73 is an electronic circuit that generates an electrical signal for causing the optical waveguide element 51 of the optical waveguide device 50 to perform a modulation operation. The modulation signal generation part 73 generates, based on transmission data given from the outside, a modulation signal, which is a high-frequency signal for causing the optical waveguide element 51 to perform an optical modulation operation according to the modulation data, and outputs the modulation signal to the modulator drive unit 72.

The modulator drive unit 72 amplifies the modulation signal input from the modulation signal generation part 73 and outputs a high-frequency electrical signal (drive signal) for driving a signal electrode of the optical waveguide element 51 included in the optical waveguide device 50. Instead of the optical waveguide device 50 and the modulator drive unit 72, the optical waveguide device 60 including the drive circuit 61 corresponding to the modulator drive unit 72 can also be used.

The optical transmission device 70 having the above configuration uses the optical waveguide device 50 or 60 whose manufacturing yield is improved while suppressing the increase in a size of the chassis 52 by the lens unit 20 or 30 according to the second and third embodiments described above. Therefore, it is possible to reduce the cost without increasing the size.

The present invention is not limited to the configuration of the above embodiment and its alternative configuration and can be implemented in various aspects without departing from the gist of the present invention.

For example, the lens portion 11 comprises the protruding curved surface in the lens units 10, 20, and 30 according to the first embodiment and the modification examples of the first embodiment described above, but the present invention is not limited thereto. The lens portion 11 may be a Fresnel lens having a saw-shaped cross section or a refractive index distribution lens configured by changing a refractive index according to a distance from a center of the optical axis. Further, the lens portion 11 may comprise a recessed curved surface depending on an optical design between the optical waveguide and the optical fiber.

Further, in the lens units 10, 20, and 30 according to the first embodiment and the modification examples of the first embodiment described above, the lens portion 11 and the holding portion 12, 22, or 22-1 are integrally configured by applying the press work to the glass heated to the softening point or higher, but the present invention is not limited to such a configuration. For example, the lens units 10, 20, and 30 may be manufactured by applying the press work to transparent plastic. Further, for example, the lens units 10, 20, and 30 may be configured by combining the lens portion 11 and the holding portion 12, 22, or 22-1 manufactured separately.

Further, in the lens units 10, 20, and 30 described above, the thick portions are respectively provided on one or two side surfaces of the holding portions, but the thick portions may be provided independently or in a series on three or higher side surfaces of the holding portion.

4. Configuration Supported by Above Embodiments

The above embodiments and modification examples support the following configurations.

(Configuration 1) A lens unit that optically couples an optical waveguide provided on a substrate and an optical fiber including a lens portion, and a holding portion that holds the lens portion, in which the holding portion has a thick portion, along one side surface that is not a surface through which an optical axis of the lens portion passes, in which a thickness of the holding portion measured in a direction of the optical axis is larger than a thickness of an other portion of the holding portion.

With the lens unit of configuration 1, it is possible to increase the mechanical strength of the lens unit and prevent the lens unit from being deformed or broken in work such as alignment, for example.

(Configuration 2) The lens unit according to configuration 1, in which a plurality of the lens portions disposed along one direction are provided, and the thick portion of the holding portion extends along a disposition direction of the lens portion.

With the lens unit of configuration 2, it is possible to prevent the lens unit from being bent along the disposition direction of the lens portions and to prevent, for example, the adhesion between the lens unit and the end surface of the optical waveguide substrate from being lowered.

(Configuration 3) The lens unit according to configuration 1 or 2, in which the holding portion further has a thick portion, on an other side surface facing the one side surface with the lens portion interposed therebetween, in which a thickness measured in the direction of the optical axis is larger than a thickness of an other portion of the holding portion.

With the lens unit of configuration 3, it is possible to further increase the mechanical strength of the lens unit.

(Configuration 4) The lens unit according to configuration 3, in which the thickness of the thick portion on the other side surface in the holding portion is thinner than the thickness of the thick portion on the one side surface.

With the lens unit of configuration 4, for example, in a case where other components such as an optical assembly are disposed between the optical waveguide and the optical fiber in a chassis while further improving the mechanical strength with two provided thick portions, with disposition of these other components near a thick portion having a thin thickness, it is possible to suppress an increase in a size of the chassis due to the provision of the thick portion.

(Configuration 5) The lens unit according to any one of configurations 1 to 4, in which the thick portion has an inclined portion whose thickness continuously decreases toward the lens portion.

With the lens unit of configuration 5, it is possible to prevent a part of the input light or the output light of the lens portion from being blocked by the thick portion.

(Configuration 6) An optical waveguide device including an optical waveguide element that has an optical waveguide provided on a substrate, a chassis that accommodates the optical waveguide element, an input optical fiber and an output optical fiber that propagate input light and output light of the optical waveguide element, and the lens unit according to any one of claims 1 to 5 that is disposed between the optical waveguide element and the input optical fiber and the output optical fiber.

With the optical waveguide device of configuration 6, it is possible to prevent the lens unit from being deformed or damaged during manufacturing while suppressing an increase in the size of the chassis and thus improve the manufacturing yield.

(Configuration 7) The optical waveguide device according to configuration 6, in which the chassis includes a case, which is a hexahedron, whose one surface is open, and a cover that covers the open one surface of the case, and the lens unit is disposed such that the one side surface provided with the thick portion faces the open one surface of the case.

With the optical waveguide device of configuration 7, it is possible to easily perform the alignment of the lens unit with the thick portion of the lens unit being gripped by, for example, using a clamping jig from the opening portion of the case.

(Configuration 8) The optical waveguide device according to configuration 7, in which the optical waveguide element has, on one end surface of the substrate, a light input end of the optical waveguide that receives the input light and a light output end of the optical waveguide that outputs the output light, both the input optical fiber and the output optical fiber are fixed to one surface of the chassis, and the lens unit disposed between the optical waveguide element and the input optical fiber and the output optical fiber includes the number of the lens portions equal to a sum of the number of input light beams input to the optical waveguide element and the number of output light beams output from the optical waveguide element.

With the optical waveguide device of configuration 8, it is possible to improve the manufacturing yield with the optical coupling of the optical waveguide element having the light input and output ends on one end surface of the substrate and the input optical fiber and the output optical fiber using one lens unit having improved mechanical strength.

(Configuration 9) The optical waveguide device according to configuration 7 or 8, in which an optical assembly disposed between the optical waveguide element and the input optical fiber and/or the output optical fiber is provided, and the optical assembly and the thick portion on the one side surface of the lens unit have portions that overlap each other in a plan view of the case as viewed from the opening.

With the optical waveguide device of configuration 9, it is possible to suppress an increase in the size of the chassis with the insertion of the optical assembly under the thick portion of one side surface to provide the thick portion.

(Configuration 10) The optical waveguide device according to any one of configurations 6 to 9, in which the optical waveguide element is an optical modulation element that modulates and outputs the input light from the input optical fiber, and an electronic circuit that drives the optical waveguide element is provided inside the chassis.

With the optical waveguide device of configuration 10, since the electronic circuit that drives the optical waveguide element, which is an optical modulation element, is accommodated in the chassis, it is possible to realize good optical modulation characteristics.

(Configuration 11) An optical transmission device including the optical waveguide device according to any one of configurations 6 to 10, and an electronic circuit that generates an electrical signal for causing the optical waveguide element to perform a modulation operation.

With the optical transmission device of configuration 11, since the optical waveguide device is used in which the manufacturing yield is improved while suppressing an increase in the chassis size by using any one of the lens units of configurations 1 to 5, it is possible to reduce the cost while avoiding an increase in the device size.

REFERENCE SIGNS LIST

10, 20, 30, 90: lens unit
11, 91: lens portion
12, 22, 22-1, 92: holding portion
12a, 22a, 22b: thick portion
121, 221, 921: lens surface
122, 222, 922: support surface
123, 125, 126, 223, 224, 923, 924, 925: side surface
124: inclined portion
13: optical axis
14, 51: optical waveguide element
15, 521: case
16, 95: optical fiber
161, 531, 541, 951: terminal portion
162, 532, 542, 952: lens
17, 55: optical assembly
18a, 18b, 97a, 97b, 97c, 97d, 98a, 98b: clamping jig
50, 60: optical waveguide device
51a, 94: substrate
51b, 93: optical waveguide
52: chassis
522: cover
53: input optical fiber
54: output optical fiber
56: relay substrate
57: signal pin
61: drive circuit
70: optical transmission device
71: light source
72: modulator drive unit
73: modulation signal generation part

The invention claimed is:

1. A lens unit that optically couples an optical waveguide provided on a substrate and an optical fiber, the lens unit comprising:

a lens portion; and a holding portion that holds the lens portion, wherein the holding portion has a thick portion, along one side surface that is not a surface through which an optical axis of the lens portion passes, in which a thickness of the holding portion measured in a direction of the optical axis is larger than a thickness of an other portion of the holding portion, and the thick portion has an inclined portion whose thickness continuously decreases toward the lens portion.

2. The lens unit according to claim 1, wherein a plurality of the lens portions disposed along one direction are provided, and the thick portion of the holding portion extends along a disposition direction of the lens portion.

3. The lens unit according to claim 1, wherein the holding portion further has a thick portion, on an other side surface facing the one side surface with the lens portion interposed therebetween, in which a thickness measured in the direction of the optical axis is larger than a thickness of an other portion of the holding portion.

4. The lens unit according to claim 3, wherein the thickness of the thick portion on the other side surface in the holding portion is thinner than the thickness of the thick portion on the one side surface.

5. An optical waveguide device comprising:

an optical waveguide element that has an optical waveguide provided on a substrate;

a chassis that accommodates the optical waveguide element;

an input optical fiber and an output optical fiber that propagate input light and output light of the optical waveguide element; and a lens unit that is disposed between the optical waveguide element and the input optical fiber and the output optical fiber, and that optically couples the optical waveguide provided on the substrate and the input optical fiber and the output optical fiber, the lens unit comprising:

a lens portion; and a holding portion that holds the lens portion, wherein the holding portion has a thick portion, along one side surface that is not a surface through which an optical axis of the lens portion passes, in which a thickness of the holding portion measured in a direction of the optical axis is larger than a thickness of an other portion of the holding portion.

6. An optical transmission device comprising:

the optical waveguide device according to claim 5; and an electronic circuit that generates an electrical signal for causing the optical waveguide element to perform a modulation operation.

7. The optical waveguide device according to claim 5, wherein the chassis includes a case, which is a hexahedron, whose one surface is open, and a cover that covers the open one surface of the case, and the lens unit is disposed such that the one side surface provided with the thick portion faces the open one surface of the case.

8. The optical waveguide device according to claim 7, wherein the optical waveguide element has, on one end surface of the substrate, a light input end of the optical waveguide that receives the input light and a light output end of the optical waveguide that outputs the output light, both the input optical fiber and the output optical fiber are fixed to one surface of the chassis, and the lens unit disposed between the optical waveguide element and the input optical fiber and the output optical fiber includes the number of the lens portions equal to a sum of the number of input light beams input to the optical waveguide element and the number of output light beams output from the optical waveguide element.

9. The optical waveguide device according to claim 7, wherein an optical assembly disposed between the optical waveguide element and the input optical fiber and/or the output optical fiber is provided, and the optical assembly and the thick portion on the one side surface of the lens unit have portions that overlap each other in a plan view of the case as viewed from the opening.

10. The optical waveguide device according to claim 6, wherein the optical waveguide element is an optical modulation element that modulates the input light from the input optical fiber and outputs the modulated light, and an electronic circuit that drives the optical waveguide element is provided inside the chassis.

\* \* \* \* \*